US009644520B2

United States Patent
Garimella et al.

(10) Patent No.: US 9,644,520 B2
(45) Date of Patent: May 9, 2017

(54) CONTROL SYSTEM FOR DETERMINING BIOFUEL CONTENT

(71) Applicant: Cummins Inc., Columbus, IN (US)

(72) Inventors: Phanindra Garimella, Bloomington, IN (US); Shankar Kumar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1084 days.

(21) Appl. No.: 13/781,131

(22) Filed: Feb. 28, 2013

(65) Prior Publication Data

US 2013/0219862 A1 Aug. 29, 2013

Related U.S. Application Data

(60) Provisional application No. 61/604,499, filed on Feb. 28, 2012.

(51) Int. Cl.
*F01N 11/00* (2006.01)
*F02D 41/00* (2006.01)
(Continued)

(52) U.S. Cl.
CPC .......... *F01N 11/007* (2013.01); *F02D 19/088* (2013.01); *F02D 41/0025* (2013.01);
(Continued)

(58) Field of Classification Search
CPC ............. F02D 19/0634; F02D 19/0636; F02D 19/0652; F02D 19/0655; F02D 19/082;
(Continued)

(56) References Cited

U.S. PATENT DOCUMENTS 7,096,123 B1   8/2006 McAdams et al.
7,155,331 B1   12/2006 Zhang et al.
(Continued)

FOREIGN PATENT DOCUMENTS

WO   2009138585   11/2009
WO   2011082373   7/2011

OTHER PUBLICATIONS

Search Report and Written Opinion, PCT/US2013/27976, ISA/US, Cummins Inc., May 13, 2013.

*Primary Examiner* — Erick Solis
*Assistant Examiner* — Anthony L Bacon
(74) *Attorney, Agent, or Firm* — Taft, Stettinius & Hollister LLP

(57) ABSTRACT

A system includes an internal combustion engine having an air intake, a fuel inlet, and exhaust outlet. The system further includes a $NO_x$ sensor operably coupled to the exhaust outlet and structured to provide an exhaust $O_2$ value, and a controller structured to functionally execute operations for determining a tank biofuel value. The controller includes an operation conditions module that interprets an intake $O_2$ value, the exhaust $O_2$ value, and a biofuel $O_2$ correlation, an $O_2$ fuel determination module that determines an $O_2$ biofuel value in response to the intake $O_2$ value, the exhaust $O_2$ value, and the biofuel $O_2$ correlation, and a fuel composition module that determines a tank biofuel value in response to the $O_2$ biofuel value. The controller further includes a biofuel reporting module that provides the tank biofuel value.

19 Claims, 2 Drawing Sheets

(51) Int. Cl.
*F02D 41/14* (2006.01)
*F02D 19/08* (2006.01)
*F02D 41/18* (2006.01)

(52) U.S. Cl.
CPC ..... *F02D 41/1456* (2013.01); *F02D 41/1461* (2013.01); *F02D 41/18* (2013.01); *F02D 2200/0402* (2013.01); *F02D 2200/0612* (2013.01); *F02D 2200/0625* (2013.01); *Y02T 10/36* (2013.01)

(58) Field of Classification Search
CPC .... F02D 19/084; F02D 19/085; F02D 19/087; F02D 19/088; F02D 2200/0611; F02D 2200/0612
See application file for complete search history.

(56) References Cited

U.S. PATENT DOCUMENTS

| | | |
|---|---|---|
| 7,155,334 B1 | 12/2006 | Stewart et al. |
| 7,266,439 B2 | 9/2007 | Wang et al. |
| 7,406,871 B2 | 8/2008 | Sugiura |
| 8,733,298 B2 * | 5/2014 | Haskara ................ F02D 35/023 123/1 A |
| 2008/0000450 A1 * | 1/2008 | Serra ................... F02D 19/0684 123/434 |
| 2009/0024303 A1 | 1/2009 | Schneider et al. |
| 2009/0024304 A1 * | 1/2009 | Takubo ................ F02D 19/088 701/103 |
| 2009/0260419 A1 * | 10/2009 | Maeda ................ F02D 41/0025 73/23.32 |
| 2009/0293345 A1 | 12/2009 | Esen et al. |
| 2009/0306879 A1 * | 12/2009 | Takubo ............... F02D 41/0032 701/104 |
| 2010/0122695 A1 * | 5/2010 | Kunisada ........... F02D 41/0025 123/575 |
| 2010/0126253 A1 * | 5/2010 | Rosel .................. F02D 19/088 73/61.43 |
| 2010/0242935 A1 * | 9/2010 | Takubo ............... F02D 41/0025 123/703 |
| 2010/0263635 A1 * | 10/2010 | Hori .................... F02D 41/0025 123/520 |
| 2011/0160982 A1 | 6/2011 | Kumar et al. |
| 2011/0166767 A1 * | 7/2011 | Kurtz ..................... F01N 9/002 701/103 |
| 2013/0024094 A1 * | 1/2013 | Shaver ................. F02D 19/088 701/104 |

* cited by examiner

CONTROL SYSTEM FOR DETERMINING BIOFUEL CONTENT

RELATED APPLICATIONS

This application is related to, and claims the benefit of, U.S. Provisional Application No. 61/604,499 entitled "CONTROL SYSTEM FOR DETERMINING BIOFUEL CONTENT", filed on 28 Feb. 2012, which is hereby incorporated by reference in its entirety for all purposes.

BACKGROUND

The technical field generally relates to internal combustion engine technology. Initiatives within the United States and abroad have promoted the expanded use of biofuels as an alternative to petroleum-based blends owing primarily to the renewable character of the base biofuel stock. The variation in properties of biofuels and biofuel blends, with reference to petroleum-based fuels, results in differences in output $NO_x$, particulate matter, fuel specific engine torque, and other responses of the engine. Accordingly, further technological developments are desirable in this area.

SUMMARY

One embodiment is a unique control system for determining a biofuel content. Other embodiments include unique methods, systems, and apparatus to determine a biofuel content. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DESCRIPTION OF ILLUSTRATIVE EMBODIMENTS

Figure 1:
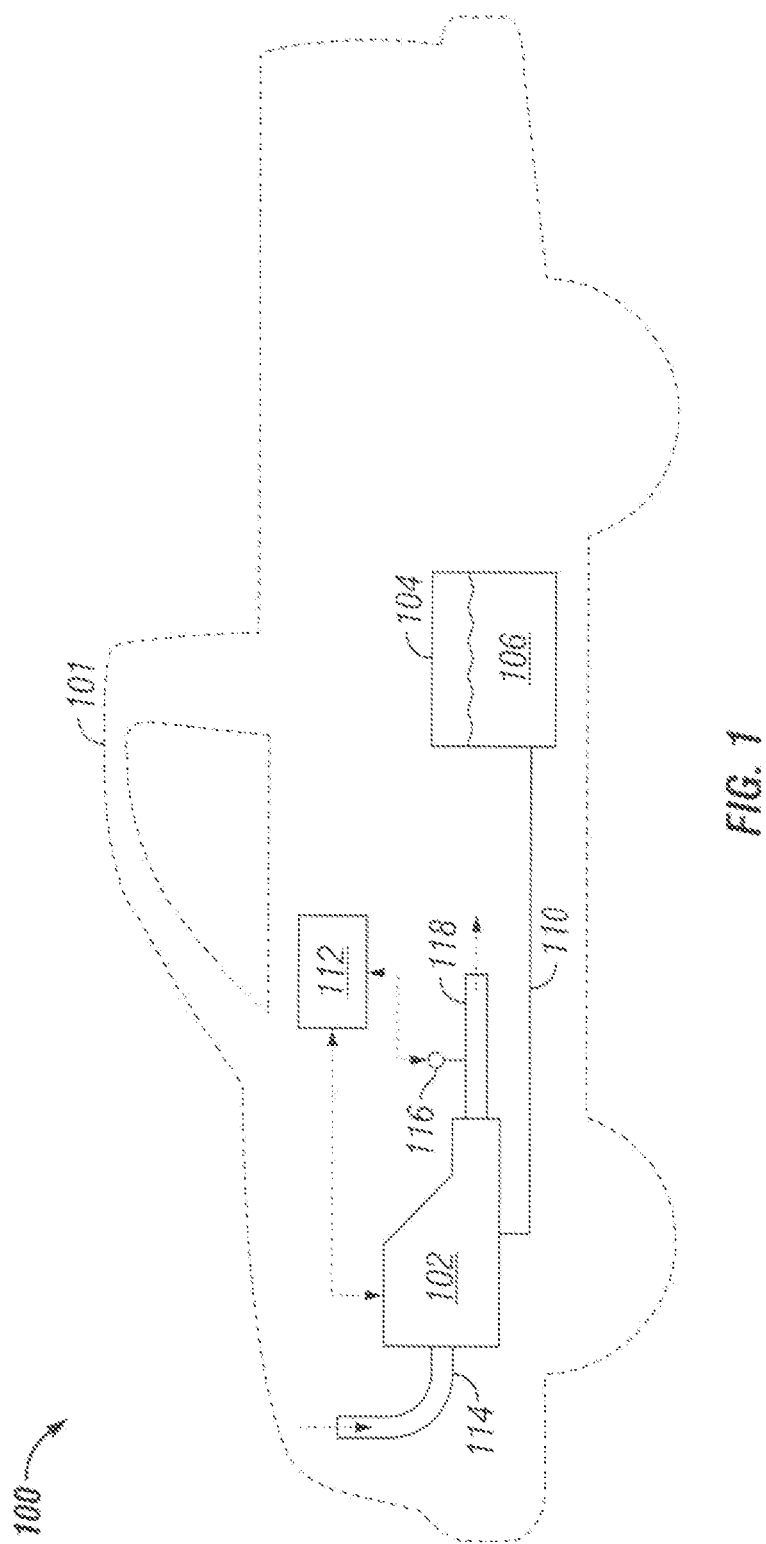
FIG. 1 is a schematic block diagram of one embodiment of a system for determining a biofuel content.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram of one embodiment of a system 100 for determining a biofuel content. The biofuel content may be expressed utilizing a percentage, fraction, index, fuel type, or any description to express the quantity of biofuel present in a fuel. The term biofuel is contemplated to be any fuel which is made from a renewable source. Exemplary biofuels include, but are not limited to, biodiesel, ethanol, biogas, biomass generated fuels, and/or any other biofuel.

The system 100 includes an internal combustion engine 102 having an air intake 114, a fuel inlet 110, and an exhaust outlet 118. In an exemplary embodiment, the internal combustion engine 102 is a diesel engine, however, it is contemplated that the internal combustion engine 102 may be a gasoline engine, a rotary engine, a gas turbine engine, or any other engine operating on the principles of internal combustion. In certain embodiments, the engine operates as a direct injected engine running excess oxygen. Running excess oxygen indicates an oxygen amount substantially greater than a stoichiometric oxygen amount during at least some portions of the engine operating cycle during powered (e.g. fueling) operations. Example and non-limiting air-to-fuel ratios that include excess oxygen include air-to-fuel ratios providing 1.1×, 1.2×, 1.3×, 1.4×, 1.5×, 2×, 3×, 5×, and greater amounts of excess oxygen relative to a stoichiometric amount of oxygen.

An example fuel inlet 110 is in flow communication with a fuel tank 104 containing a fuel 106. The system 100 further includes a $NO_x$ sensor 116 operably coupled to the exhaust outlet 118. In certain embodiments, the $NO_x$ sensor 116 provides a $NO_x$ reading, and/or provides an $O_2$ reading. The $O_2$ reading from a $NO_x$ sensor can be converted into a direct exhaust oxygen composition, unlike the reading from an oxygen sensor which provides a lambda ($\lambda$) value that, except at exactly stoichiometric conditions, does not provide a value that can be converted into a direct exhaust oxygen composition. While the embodiment in FIG. 1 depicts the internal combustion engine 102 being utilized to power a vehicle 101, it is contemplated that system 100 may be incorporated into a power generation unit, aircraft, train, or any other system using power from an internal combustion engine 102.

In certain embodiments, the system 100 further includes a controller 112 structured to perform certain operations to determine a biofuel content. In certain embodiments, the controller 112 forms a portion of a processing subsystem including one or more computing devices having memory, processing, and communication hardware. The controller 112 may be a single device or a distributed device, and the functions of the controller 112 may be performed by hardware or software.

In certain embodiments, the controller 112 includes one or more modules structured to functionally execute the operations of the controller 112. In certain embodiments, the controller 112 includes an operation conditions module, an $O_2$ fuel determination module, a fuel composition module, and a biofuel reporting module. In certain additional or alternative embodiments, the system includes an engine operations module, a $NO_x$ fuel determination module, and/or a BSFC fuel determination module. The description herein including modules emphasizes the structural independence of the aspects of the controller, and illustrates one grouping of operations and responsibilities of the controller 112. Other groupings that execute similar overall operations are understood within the scope of the present application. Modules may be implemented in hardware and/or software on computer readable medium, and modules may be distributed across various hardware or software components. More specific descriptions of certain embodiments of controller 112 operations are included in the section referencing FIG. 2.

Certain operations described herein include interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
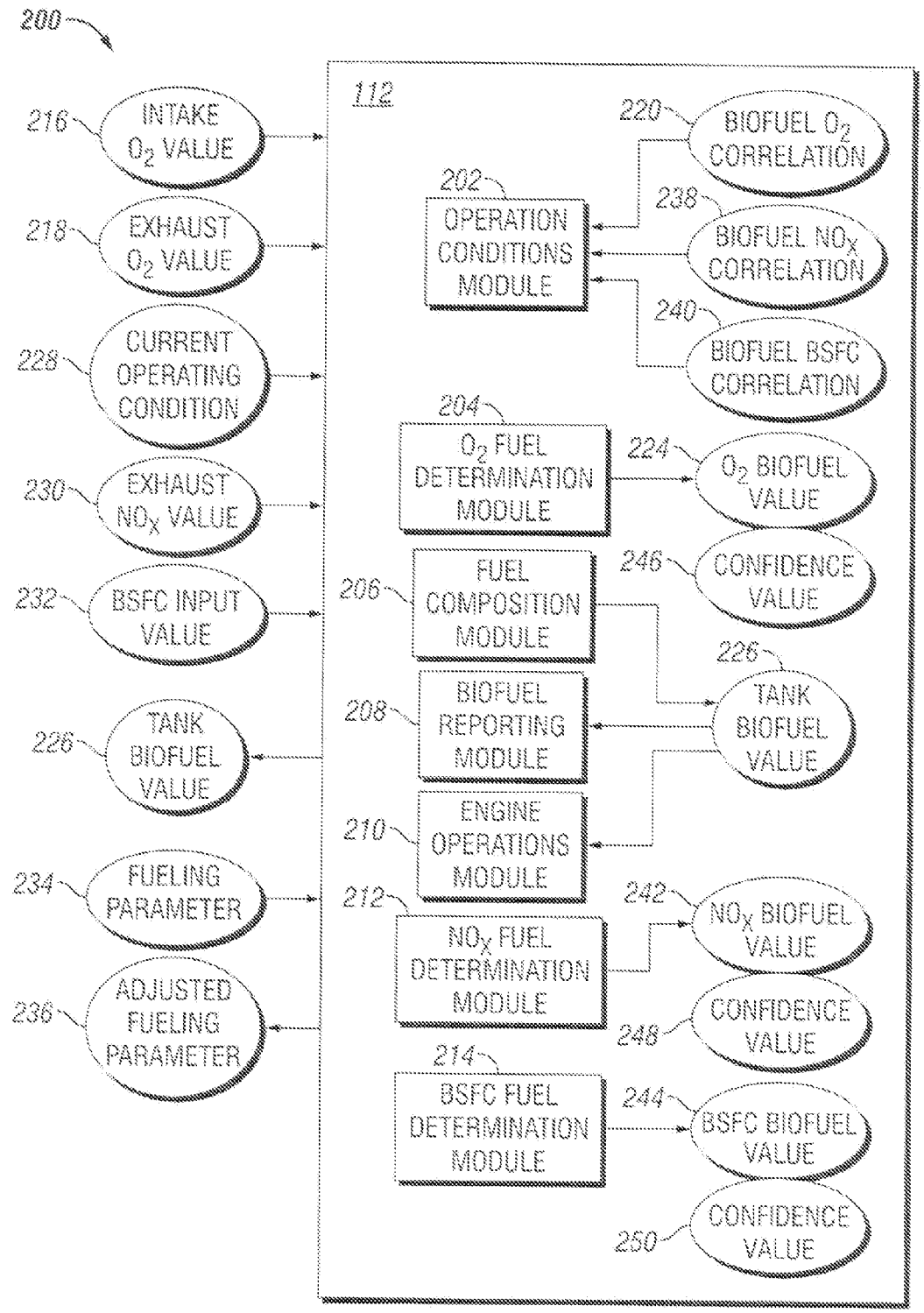
FIG. 2 is a schematic block diagram of a controller that functionally executes certain operations for determining a biofuel content.

FIG. 2 is a schematic block diagram of a controller 112 that functionally executes certain operations for determining a biofuel content. An example controller 112 includes an operation conditions module 202 which interprets an intake $O_2$ value 216, an exhaust $O_2$ value 218, and a biofuel $O_2$ correlation 220. The intake $O_2$ value 216 is any description of the amount of oxygen entering the engine. The intake $O_2$ value 216 may be inclusive or exclusive of any $O_2$ in the EGR gas, where present, according to the desired material balance position for the system. The intake $O_2$ value 216 may be a moles, mass, fraction, or other value understood in the art to describe $O_2$ content of the gas on the intake side. An example intake $O_2$ value 216 is determined from a mass-air flow sensor (not shown), an engine flow correlation, or from any models or virtual sensors to determine the intake $O_2$ value 216. The exhaust $O_2$ value 218 is any description of oxygen remaining in the exhaust flow. The exhaust $O_2$ value 218 may be inclusive or exclusive of any $O_2$ in the EGR gas, where present, according to the desired material balance position for the system, and further according to a position of a sensor that detects at least a portion of the oxygen to determine the exhaust $O_2$ value 218.

In certain embodiments, a $NO_x$ sensor 116 determines the exhaust $O_2$ value 218. In certain embodiments, a properly calibrated wide band oxygen sensor could be utilized to provide the exhaust $O_2$ value 218, however the range of such devices is still limited and this would not be possible for all applications. One of skill in the art, having the benefit of the disclosures herein, can readily determine from manufacturer specified information whether a specific wide band oxygen sensor will function acceptably across the expected range of oxygen amounts in the exhaust, or whether a more capable sensor such as the $O_2$ channel of a $NO_x$ sensor will be required.

The biofuel $O_2$ correlation 220 is a description of expected exhaust $O_2$ values as a function of intake $O_2$ values 216 and/or other engine operating conditions 228. Biofuels of varying compositions include differentiated amounts of system oxygen, and accordingly the combustion of the biofuels results in distinguishable differences in the exhaust $O_2$ concentrations. In previously known systems, the final air-fuel ratio in a stoichimetric system is utilized to determine whether a biofuel is present. However, such systems will not function for engines that are not running at stoichiometric conditions. For example, in an engine running excess air, the final air-fuel ratio is not a control element and a material balance based solely on the air-fuel ratio, or upon a confirmation that the air-fuel ratio is stoichimetric, will be erroneous.

The controller 112 further includes an $O_2$ fuel determination module 204 that determines an $O_2$ biofuel value 224 in response to the intake $O_2$ value 216, the exhaust $O_2$ value 218, and the biofuel $O_2$ correlation 220. The controller 112 further includes a fuel composition module 206 that determines a tank biofuel value 226 in response to the $O_2$ biofuel value 224. An example fuel composition module 206 selects the tank biofuel value 226 that matches the $O_2$ biofuel value 224. In certain embodiments, the fuel composition module 206 may filter the $O_2$ biofuel value 224 and/or require repeated observations at or near a given $O_2$ biofuel value 224 before changing the tank biofuel value 226. In certain embodiments, the fuel composition module 206 may increment the tank biofuel value 226 toward the $O_2$ biofuel value 224, and/or perform any other processing steps known in the art in the determining the tank biofuel value 226.

The example controller 112 further includes a biofuel reporting module 208 that provides the tank biofuel value 226. The tank biofuel value 226 may be provided to a communications, network, or data link, and/or the tank biofuel value 226 may be provided to a module in the controller 112 for use in engine operation algorithms to adjust fueling according to the tank biofuel value 226. In certain embodiments, providing the tank biofuel value 226 includes storing the tank biofuel value 226, and/or a series of tank biofuel values 226, on a computer readable medium for logging or other later use. The described operations for providing the tank biofuel value 226 are examples and non-limiting.

In certain embodiments, the controller 112 includes an engine operations module 210 that adjusts a fueling parameter 234 in response to the tank biofuel value 226. For example, an engine operations module 210 interprets a fueling parameter 234, and provides an adjusted fueling parameter 236 in response to the tank biofuel value 226. Example and non-limiting fueling parameters include a fueling amount, a fueling timing value, a fueling schedule change (e.g. timing and amounts of multiple fuel injection events), an air/fuel ratio change, and/or an EGR fraction adjustment. The described adjusted fueling parameters 236 are non-limiting examples.

In certain embodiments, the controller 112 includes the operation conditions module 202 further interpreting a current operating condition 228, an exhaust $NO_x$ value 230, and a biofuel $NO_x$ correlation 238. The current operating condition 228 is any engine operating parameter or set of parameters that can be utilized to determine a feedforward estimate of the engine out NOx amount. Many engine out NOx correlations are known in the art, and are not described herein in further detail. Example and non-limiting current operating conditions 228 include engine speed, engine timing values, engine fueling values, current EGR fraction, intake manifold temperatures, engine fueling schedule (e.g. pre-, main, and post-injection events), fresh air flow values, engine coolant temperatures, etc. The biofuel NOx correlation 238 includes values of engine NOx output amounts as a function of the parameters in the current operating condition 228. The controller 112 further includes a $NO_x$ fuel determination module 212 that determines a $NO_x$ biofuel value 242 in response to the current operating condition 228, the exhaust $NO_x$ value 230, and the biofuel $NO_x$ correlation 238.

In certain further embodiments, the fuel composition module 206 further determines the tank biofuel value 226 in response to the $NO_x$ biofuel value 238. An example fuel composition module 206 determines the tank biofuel value 226 from the $NO_x$ biofuel value 242 directly, and/or determines the tank biofuel value 226 from the $NO_x$ biofuel value 242 without considering the $O_2$ biofuel value 224. Additionally or alternatively, the fuel composition module 206 determines the tank biofuel value 226 as an average of the $O_2$ biofuel value 224 and the $NO_x$ biofuel value 242. In certain embodiments, the average of the $O_2$ biofuel value and the $NO_x$ biofuel value includes a weighted average of the values. The weighting for the weighted average may be determined from, in one example, a confidence value 246 corresponding to the $O_2$ biofuel value 224 and/or a confidence value 248 corresponding to the $NO_x$ biofuel value 242. The confidence values 246, 248 may be determined according to a known or estimated accuracy of the biofuel values 224, 242, according to a predetermined set of engine operating conditions scheduled to favor one of the biofuel values 224, 242 over the other, and/or according to an amount of time since the respective biofuel values 224, 242 have been updated. The described weighting operations of the fuel composition module 206 for the biofuel values 224, 242 are non-limiting examples.

In certain embodiments, the fuel composition module 206 further determines the tank biofuel value 226 in response to the $O_2$ biofuel value 224 and the $NO_x$ biofuel value 242 being within a threshold agreement value (not shown). For example, where the $O_2$ biofuel value 224 and the $NO_x$ biofuel value 242 are within a predetermined percentage of each other, where the $O_2$ biofuel value 224 and the $NO_x$ biofuel value 242 are within a predetermined absolute value of each other, and/or where the $O_2$ biofuel value 224 and the $NO_x$ biofuel value 242 are describing the same or a similar qualitative fuel type (e.g. B20 biodeisel), an example fuel composition module 206 utilizes the $O_2$ biofuel value 224 and the $NO_x$ biofuel value 242 to update the tank biofuel value 226.

An example controller 112 includes the operation conditions module 202 further interpreting a brake specific fuel consumption (BSFC) input value 232 and a biofuel BSFC correlation 240. The BSFC input value 232 is any description of the current fuel consumption rate of the engine, and may be normalized or associated with specific engine operating conditions (e.g. fuel consumption at 200 ft-lb, 1000 rpm) or provided as a number of BSFC values associated with corresponding engine operating conditions. Fuels having varying biofuel compositions, including varying types and varying fractions of biofuel components, have differential fuel energy densities and combustion characteristics. Accordingly, fuels having varying biofuel compositions have differential BSFC values across the engine speed-load space. The biofuel BSFC correlation 240 can be utilized by mapping various fuels throughout the engine speed-load space, at specific speed-load points, and/or at a number of speed-load points, and realized BSFC values during operations can be utilized by the BSFC fuel determination module 214 to identify the likely fuel being utilized. Certain fuels may be mapped specifically—e.g. an ethanol fuel, and other fuels may be matched by interpolating, such as determining a B50 fuel by interpolating between stored B20 and B60 data.

The controller 112 further includes a BSFC fuel determination module 214 that determines a BSFC biofuel value 244 in response to the BSFC input value 232 and the biofuel BSFC correlation 240. The biofuel BSFC correlation 240 includes a number of BSFC biofuel values 244 resulting from specific BSFC input values 232. In certain embodiments, the biofuel BSFC correlation 240 correspond to BSFC input values 232 at specific current operating conditions 228.

In certain embodiments, the fuel composition module 206 further determines the tank biofuel value 226 in response to the BSFC biofuel value 244. An example controller 112 further includes the fuel composition module 206 determining the tank biofuel value as an average of the $O_2$ biofuel value and/or the $NO_x$ biofuel value, and the BSFC biofuel value. A still further example controller 112 includes the average of the $O_2$ biofuel value 224 and/or the $NO_x$ biofuel value 242, and the BSFC biofuel value 244 being a weighted average of the values. In certain embodiments, the controller 112 includes the fuel composition module 206 further determining the tank biofuel value 226 as one of the $O_2$ biofuel value 224, the $NO_x$ biofuel value 242, and/or the BSFC biofuel value 244, in response to a confidence value 246, 248, 250 of each of the values 224, 242, 244. In certain embodiments, the fuel composition module 206 further determines the tank biofuel value 226 in response to any two of the $O_2$ biofuel value 224, the $NO_x$ biofuel value 242, and the BSFC biofuel value 244 being within a threshold agreement value (not shown).

An example controller 112 includes the operation conditions module 202 further interpreting a BSFC input value 244 and a biofuel BSFC correlation 238, and the controller further includes a BSFC fuel determination module 214 that determines a BSFC biofuel value 244 in response to the BSFC input value 232 and the biofuel BSFC correlation 238. The fuel composition module 206 further determines the tank biofuel value 226 in response to the BSFC biofuel value 244. In certain further embodiments, the fuel composition module 206 further determines the tank biofuel value 226 in response to the $O_2$ biofuel value 224 and the BSFC biofuel value 244 being within a threshold agreement value (not shown).

The schematic flow description which follows provides an illustrative embodiment of performing procedures for determining the biofuel content of a fuel. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An example procedure includes an operation to interpret a current operating condition, an exhaust $NO_x$ value, and a biofuel $NO_x$ correlation, and an operation to determine a tank biofuel value in response to the current operating condition, the exhaust $NO_x$ value, and the biofuel $NO_x$ correlation. The procedure further includes an operation to report the tank biofuel value. In certain embodiments, the procedure includes an operation to adjust a fueling parameter in response to the tank biofuel value.

In certain embodiments, the procedure includes an operation to interpret an intake $O_2$ value, an exhaust $O_2$ value, and a biofuel $O_2$ correlation, and an operation to determine the tank biofuel value further in response to the intake $O_2$ value, the exhaust $O_2$ value, and the biofuel $O_2$ correlation. An example procedure further includes an operation to determine the tank biofuel value as an average of the $O_2$ biofuel value and the $NO_x$ biofuel value. In certain embodiments, the procedure includes determining the tank biofuel value as a weighted average of the $O_2$ biofuel value and the $NO_x$ biofuel value. In certain further embodiments, the procedure includes an operation to determine the tank biofuel value as a more reliable one of the $O_2$ biofuel value and the $NO_x$ biofuel value. An example procedure further includes an operation to interpret a brake specific fuel consumption (BSFC) input value and a biofuel BSFC correlation, and an operation to determine the tank biofuel value in response to the BSFC value and the biofuel BSFC correlation.

In certain embodiments, the procedure includes an operation to determine the tank biofuel value as an average of the BSFC biofuel value and the biofuel $NO_x$ correlation. An example procedure further includes an operation to determine the tank biofuel value as a weighted average of the biofuel $O_2$ correlation and the biofuel $NO_x$ correlation. Additionally or alternatively, the procedure includes an operation to determine the tank biofuel value as a more reliable one of the BSFC biofuel value and the $NO_x$ biofuel value.

Non-limiting examples of a means for determining a biofuel value in response to the at least one of an exhaust $O_2$ value and an exhaust $NO_x$ value are described. An example means includes calibrating (a) predetermined exhaust $O_2$ value(s) at one or more engine operating conditions and with selected biofuel compositions, and/or determining an exhaust $O_2$ value in response to a modeled engine combustion operation, including an engine air-to-fuel ratio and/or correcting for transient effects of EGR fraction changes. The example means further includes determining a presently known $O_2$ value in the exhaust in a feedback manner, including a sensor providing a value representative of the $O_2$ value in the exhaust. An example sensor includes a $NO_x$ sensor providing an $O_2$ value, and another example sensor includes a calibrated wide-range oxygen sensor operating at conditions known or estimated to be valid for estimating the $O_2$ value in the exhaust. The example means further includes comparing the feedback determined $O_2$ value of the exhaust to the determined $O_2$ exhaust value according to the calibrated and/or modeled exhaust $O_2$ values with the selected biofuel compositions, and selecting an $O_2$ biofuel value in response to the comparing. The selected $O_2$ biofuel value may be one of the selected biofuel compositions, and/or may be an interpolated or extrapolated biofuel composition based on the selected biofuel compositions.

The example means further includes determining a tank biofuel value in response to the $O_2$ biofuel value. An example determining includes incrementing a tank biofuel value toward the $O_2$ biofuel value, determining a reliability of the $O_2$ biofuel value and using the $O_2$ biofuel value as the tank biofuel value if the reliability exceeds a threshold (e.g. operating conditions match the calibrated operating conditions, operating conditions are known to be comparable to the calibrated operating conditions, operating conditions are consistent with operating conditions wherein the modeled $O_2$ exhaust is known or estimated to be valid, etc.). Another example determining includes accumulating a number of instances of the $O_2$ biofuel value, and setting the tank biofuel value to the $O_2$ biofuel value after a selected number of instances of the $O_2$ biofuel value have occurred. Another example determining includes moving the tank biofuel value toward the $O_2$ biofuel value in filtered and/or moving average manner.

Another example means includes calibrating (a) predetermined exhaust $NO_x$ value(s) at one or more engine operating conditions and with selected biofuel compositions, and/or determining an exhaust $NO_x$ value in response to a modeled engine combustion operation, including any engine operating parameters that may be utilized to determine an engine $NO_x$ output amount. The example means further includes determining a presently known $NO_x$ value in the exhaust in a feedback manner, including a sensor providing a value representative of the $NO_x$ value in the exhaust. An example sensor includes a $NO_x$ sensor providing a $NO_x$ value.

The example means further includes comparing the feedback determined $NO_x$ value of the exhaust to the determined $NO_x$ exhaust value according to the calibrated and/or modeled exhaust $NO_x$ values with the selected biofuel compositions, and selecting an $NO_x$ biofuel value in response to the comparing. The selected $NO_x$ biofuel value may be one of the selected biofuel compositions, and/or may be an interpolated or extrapolated biofuel composition based on the selected biofuel compositions.

The example means further includes determining a tank biofuel value in response to the $NO_x$ biofuel value. An example determining includes incrementing a tank biofuel value toward the $NO_x$ biofuel value, determining a reliability of the $NO_x$ biofuel value and using the $NO_x$ biofuel value as the tank biofuel value if the reliability exceeds a threshold (e.g. operating conditions match the calibrated operating conditions, operating conditions are known to be comparable to the calibrated operating conditions, operating conditions are consistent with operating conditions wherein the modeled $NO_x$ exhaust is known or estimated to be valid, etc.). Another example determining includes accumulating a number of instances of the $NO_x$ biofuel value, and setting the tank biofuel value to the $NO_x$ biofuel value after a selected number of instances of the $NO_x$ biofuel value have occurred. Another example determining includes moving the tank biofuel value toward the $NO_x$ biofuel value in filtered and/or moving average manner.

Non-limiting examples of a means for determining the biofuel value in response to a brake specific fuel consumption (BSFC) of the internal combustion engine are described. An example means includes calibrating (a) predetermined exhaust BSFC value(s) at one or more engine operating conditions and with selected biofuel compositions. The example means further includes determining a presently known BSFC value in the exhaust in a feedback manner, including determining engine torque and/or power output and fuel consumption, and calculating a runtime BSFC thereby. The runtime BSFC may be a real-time BSFC, a filtered or averaged BSFC, and/or a bucketed BSFC value over certain operating periods such as periods of steady state operation.

The example means further includes comparing the feedback determined BSFC value to the determined BSFC exhaust value according to the calibrated BSFC values with the selected biofuel compositions, and selecting an BSFC biofuel value in response to the comparing. The selected BSFC biofuel value may be one of the selected biofuel compositions, and/or may be an interpolated or extrapolated biofuel composition based on the selected biofuel compositions.

The example means further includes determining a tank biofuel value in response to the BSFC biofuel value. An example determining includes incrementing a tank biofuel value toward the BSFC biofuel value, determining a reliability of the BSFC biofuel value and using the BSFC biofuel value as the tank biofuel value if the reliability exceeds a threshold (e.g. operating conditions match the calibrated operating conditions, operating conditions are known to be comparable to the calibrated operating conditions, etc.). Another example determining includes accumulating a number of instances of the BSFC biofuel value, and setting the tank biofuel value to the BSFC biofuel value after a selected number of instances of the BSFC biofuel value have occurred. Another example determining includes moving the tank biofuel value toward the BSFC biofuel value in filtered and/or moving average manner.

In certain embodiments, the means to determine the tank biofuel value in response to the O2 biofuel value, the NOx biofuel value, and/or the BSFC fuel value includes determining the tank biofuel value in response to any one, two, or three of the biofuel values. The determining includes averaging one or more values, weighted averaging one or more values (e.g. according to a confidence value, a present reliability value corresponding to each of the values, according to the validity of the underlying calibration or model corresponding to the value and the present operating conditions, etc.). An example determining includes selecting an average of two of the values that are closer in agreement, and setting aside one of the values that is presently and outlier. Another example includes selecting a most reliable one of the values based upon the present operating conditions.

As is evident from the figures and text presented above, a variety of embodiments according to the present invention are contemplated.

An example system includes an internal combustion engine having an air intake, a fuel inlet and an exhaust outlet. In certain embodiments, the internal combustion engine is a direct injected engine running excess oxygen. The system includes a $NO_x$ sensor operably coupled to the exhaust outlet and structured to provide an exhaust $O_2$ value, and a controller structured to functionally execute operations to determine a biofuel content of the fuel. The controller includes an operation conditions module that interprets an intake $O_2$ value, the exhaust $O_2$ value, and a biofuel $O_2$ correlation, an $O_2$ fuel determination module that determines an $O_2$ biofuel value in response to the intake $O_2$ value, the exhaust $O_2$ value, and the biofuel $O_2$ correlation, and a fuel composition module that determines a tank biofuel value in response to the $O_2$ biofuel value. The controller further includes a biofuel reporting module that provides the tank biofuel value.

Certain non-limiting features included in certain embodiments of the system are described following. An example system further includes an engine operations module that adjusts a fueling parameter in response to the tank biofuel value. A system includes the operation conditions module further interpreting a current operating condition, an exhaust $NO_x$ value, and a biofuel $NO_x$ correlation, and the controller including a $NO_x$ fuel determination module that determines a $NO_x$ biofuel value in response to the current operating condition, the exhaust $NO_x$ value, and the biofuel $NO_x$ correlation. The fuel composition module further determines the tank biofuel value in response to the $NO_x$ biofuel value. An example system still further includes the fuel composition module further determining the tank biofuel value as an average of the $O_2$ biofuel value and the $NO_x$ biofuel value. In certain embodiments, the average of the $O_2$ biofuel value and the $NO_x$ biofuel value includes a weighted average of the values. In certain embodiments, the fuel composition module further determines the tank biofuel value as one of the $O_2$ biofuel value and the $NO_x$ biofuel value in response to a confidence value of each of the $O_2$ biofuel value and the $NO_x$ biofuel value.

In certain embodiments, the operation conditions module further interprets a brake specific fuel consumption (BSFC) input value and a biofuel BSFC correlation, and the controller further includes a BSFC fuel determination module that determines a BSFC biofuel value in response to the BSFC input value and the biofuel BSFC correlation. The fuel composition module further determines the tank biofuel value in response to the BSFC biofuel value. In certain embodiments, the fuel composition module further determines the tank biofuel value as an average of the $O_2$ biofuel value, the $NO_x$ biofuel value, and the BSFC biofuel value. In still further embodiments, the average of the $O_2$ biofuel value, the $NO_x$ biofuel value, and the BSFC biofuel value includes a weighted average of the values. In certain embodiments, the fuel composition module further determines the tank biofuel value as one of the $O_2$ biofuel value, the $NO_x$ biofuel value, and the BSFC biofuel value, in response to a confidence value of each of the $O_2$ biofuel value, the $NO_x$ biofuel value, and the BSFC biofuel value.

An example system includes the operation conditions module further interpreting a brake specific fuel consumption (BSFC) input value and a biofuel BSFC correlation. In a further embodiment, the controller further includes a BSFC fuel determination module that determines a BSFC biofuel value in response to the BSFC input value and the biofuel BSFC correlation, where the fuel composition module further determines the tank biofuel value in response to the BSFC biofuel value.

Another example set of embodiments is an apparatus including an operation conditions module structured to interpret an intake $O_2$ value, an exhaust $O_2$ value, and a biofuel $O_2$ correlation. The apparatus further includes an $O_2$ fuel determination module that determines an $O_2$ biofuel value in response to the intake $O_2$ value, the exhaust $O_2$ value, and the biofuel $O_2$ correlation, and a fuel composition module that determines a tank biofuel value in response to the $O_2$ biofuel value. In a further embodiment, the apparatus includes a biofuel reporting module that provides the tank biofuel value.

Certain non-limiting features included in certain embodiments of the apparatus are described following. An apparatus further includes an engine operations module that adjusts a fueling parameter in response to the tank biofuel value. In certain embodiments, the apparatus includes the operation conditions module further interpreting a current operating condition, an exhaust $NO_x$ value, and a biofuel $NO_x$ correlation, and the apparatus further includes a $NO_x$ fuel determination module that determines a $NO_x$ biofuel value in response to the current operating condition, the exhaust $NO_x$ value, and the biofuel $NO_x$ correlation. In a further embodiment, the fuel composition module further determines the tank biofuel value in response to the $NO_x$ biofuel value. In certain embodiments, the fuel composition module further determines the tank biofuel value as an average of the $O_2$ biofuel value and the $NO_x$ biofuel value. In certain embodiments, the average of the $O_2$ biofuel value and the $NO_x$ biofuel value comprises a weighted average of the values.

In certain embodiments, the fuel composition module further determines the tank biofuel value in response to the $O_2$ biofuel value and the $NO_x$ biofuel value being within a threshold agreement value. Additionally or alternatively, the fuel composition module further determines the tank biofuel value one of the $O_2$ biofuel value and the $NO_x$ biofuel value in response to a confidence value of each of the $O_2$ biofuel value and the $NO_x$ biofuel value.

An example apparatus includes the operation conditions module further interpreting a brake specific fuel consumption (BSFC) input value and a biofuel BSFC correlation, where the controller further includes a BSFC fuel determination module that determines a BSFC biofuel value in response to the BSFC input value and the biofuel BSFC correlation, and where the fuel composition module further determines the tank biofuel value in response to the BSFC biofuel value. An example apparatus further includes the fuel composition module determining the tank biofuel value as an average of the $O_2$ biofuel value, the $NO_x$ biofuel value, and the BSFC biofuel value. A still further example apparatus includes the average of the $O_2$ biofuel value, the $NO_x$ biofuel value, and the BSFC biofuel value being a weighted average of the values.

In certain embodiments, the apparatus includes the fuel composition module further determining the tank biofuel value as one of the $O_2$ biofuel value, the $NO_x$ biofuel value, and the BSFC biofuel value, in response to a confidence value of each of the $O_2$ biofuel value, the $NO_x$ biofuel value, and the BSFC biofuel value. Additionally or alternatively, the fuel composition module further determines the tank biofuel value in response to any two of the $O_2$ biofuel value, the $NO_x$ biofuel value, and the BSFC biofuel value being within a threshold agreement value. An example apparatus includes the operation conditions module further interpreting a BSFC input value and a biofuel BSFC correlation, and the controller further includes a BSFC fuel determination module that determines a BSFC biofuel value in response to the BSFC input value and the biofuel BSFC correlation. The fuel composition module further determines the tank biofuel value in response to the BSFC biofuel value. In certain further embodiments, the fuel composition module further determines the tank biofuel value in response to the $O_2$ biofuel value and the BSFC biofuel value being within a threshold agreement value.

Another example set of embodiments is a method including interpreting a current operating condition, an exhaust $NO_x$ value, and a biofuel $NO_x$ correlation, determining a tank biofuel value in response to the current operating condition, the exhaust $NO_x$ value, and the biofuel $NO_x$ correlation, and reporting the tank biofuel value. In certain embodiments, the method includes adjusting a fueling parameter in response to the tank biofuel value. In certain embodiments, the method includes interpreting an intake $O_2$ value, an exhaust $O_2$ value, and a biofuel $O_2$ correlation, and determining the tank biofuel value further in response to the intake $O_2$ value, the exhaust $O_2$ value, and the biofuel $O_2$ correlation. An example method further includes determining the tank biofuel value as an average of the $O_2$ biofuel value and the $NO_x$ biofuel value. In certain embodiments, the method includes determining the tank biofuel value as a weighted average of the $O_2$ biofuel value and the $NO_x$ biofuel value. In certain further embodiments, the method includes determining the tank biofuel value as a more reliable one of the $O_2$ biofuel value and the $NO_x$ biofuel value. An example method further includes interpreting a brake specific fuel consumption (BSFC) input value and a biofuel BSFC correlation, and determining the tank biofuel value in response to the BSFC value and the biofuel BSFC correlation.

In certain embodiments, the method includes determining the tank biofuel value as an average of the BSFC biofuel value and the biofuel $NO_x$ correlation. An example method further includes determining the tank biofuel value as a weighted average of the biofuel $O_2$ correlation and the biofuel $NO_x$ correlation. Additionally or alternatively, the method includes determining the tank biofuel value as a more reliable one of the BSFC biofuel value and the $NO_x$ biofuel value.

Another example set of embodiments is a system including a direct injected internal combustion engine having an exhaust outlet and running excess oxygen, a $NO_x$ sensor in flow communication with an exhaust stream within the exhaust outlet, the $NO_x$ sensor providing at least one of an exhaust $O_2$ value and an exhaust $NO_x$ value, and a means for determining a biofuel value in response to the at least one of an exhaust $O_2$ value and an exhaust $NO_x$ value. The example system further includes the means for determining the biofuel value further including determining the biofuel value further in response to a brake specific fuel consumption (BSFC) of the internal combustion engine. In certain embodiments, the system includes the means for determining the biofuel value further including a means for determining an $O_2$ balance across the internal combustion engine.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    an internal combustion engine having an air intake, a fuel inlet connected to a fuel tank, and an exhaust outlet;
    a $NO_x$ sensor operably coupled to the exhaust outlet and structured to provide an exhaust $O_2$ value; and
    a controller including a plurality of modules implemented in at least one of hardware and a computer readable medium, the plurality of modules structured to control a fueling operation of the internal combustion engine with fuel from the fuel tank, the plurality of modules comprising:
        an operation conditions module structured to interpret an intake $O_2$ value, the exhaust $O_2$ value, and a biofuel $O_2$ correlation;
        an $O_2$ fuel determination module structured to determine an $O_2$ biofuel value in response to the intake $O_2$ value, the exhaust $O_2$ value, and the biofuel $O_2$ correlation;
        a fuel composition module structured to determine a tank biofuel value for the fuel in the fuel tank in response to the $O_2$ biofuel value; and
        a biofuel reporting module structured to provide the tank biofuel value and the tank biofuel value is utilized by the controller to control the fueling operation of the internal combustion engine, wherein the o oration conditions module is further structured to interpret a current operating condition, an exhaust $NO_x$ value, and a biofuel $NO_x$ correlation, the controller further comprising a $NO_x$ fuel determination module structured to determine a $NO_x$ biofuel value in response to the current operating condition, the exhaust $NO_x$ value, and the biofuel $NO_x$ correlation, and wherein the fuel composition module is further structured to determine the tank biofuel value in response to the $NO_x$ biofuel value.

2. The system of claim 1, further comprising an engine operations module structured to adjust a fueling parameter in response to the tank biofuel value.

3. The system of claim 1, wherein the fuel composition module is further structured to determine the tank biofuel value as an average of the $O_2$ biofuel value and the $NO_x$ biofuel value.

4. The system of claim 3, wherein the average of the $O_2$ biofuel value and the $NO_x$ biofuel value comprises a weighted average of the values.

5. The system of claim 1, wherein the fuel composition module is further structured to determine the tank biofuel value as one of the $O_2$ biofuel value and the $NO_x$ biofuel value in response to a confidence value of each of the $O_2$ biofuel value and the $NO_x$ biofuel value.

6. The system of claim 1, wherein the operation conditions module is further structured to interpret a brake specific fuel consumption (BSFC) input value and a biofuel BSFC correlation, the controller further comprising a BSFC fuel determination module structured to determine a BSFC biofuel value in response to the BSFC input value and the biofuel BSFC correlation, and wherein the fuel composition module is further structured to determine the tank biofuel value in response to the BSFC biofuel value.

7. The system of claim 6, wherein the fuel composition module is further structured to determine the tank biofuel value as an average of the $O_2$ biofuel value, the $NO_x$ biofuel value, and the BSFC biofuel value.

8. The system of claim 7, wherein the average of the $O_2$ biofuel value, the $NO_x$ biofuel value, and the BSFC biofuel value comprises a weighted average of the values.

9. The system of claim 6, wherein the fuel composition module is further structured to determine the tank biofuel value as one of the $O_2$ biofuel value, the $NO_x$ biofuel value, and the BSFC biofuel value, in response to a confidence value of each of the $O_2$ biofuel value, the $NO_x$ biofuel value, and the BSFC biofuel value.

10. An apparatus for controlling a fueling operation of an internal combustion engine with fuel from a fuel tank of the internal combustion engine, the apparatus including a plurality of modules implemented in at least one of hardware and a computer readable medium, the plurality of modules comprising:
an operation conditions module structured to interpret an intake $O_2$ value, an exhaust $O_2$ value, and a biofuel $O_2$ correlation;
an $O_2$ fuel determination module structured to determine an $O_2$ biofuel value in response to the intake $O_2$ value, the exhaust $O_2$ value, and the biofuel $O_2$ correlation;
a fuel composition module structured to determine a tank biofuel value of the fuel in the fuel tank in response to the $O_2$ biofuel value;
a biofuel reporting module structured to provide the tank biofuel value; and
an engine operations module structured to adjust a fueling parameter in response to the tank biofuel value, wherein the fueling parameter is utilized by the apparatus to control the fueling operation of the internal combustion engine, wherein the operation conditions module is further structured to interpret a current operating condition, an exhaust $NO_x$ value, and a biofuel $NO_x$ correlation, the apparatus further comprising a $NO_x$ fuel determination module structured to determine a $NO_x$ biofuel value in response to the current operating condition, the exhaust $NO_x$ value, and the biofuel $NO_x$ correlation, and wherein the fuel composition module is further structured to determine the tank biofuel value in response to the $NO_x$ biofuel value.

11. An apparatus for controlling a fueling operation of an internal combustion engine with fuel from a fuel tank of the internal combustion engine, the apparatus including a plurality of modules implemented in at least one of hardware and a computer readable medium, the plurality of modules comprising:
an operation condition model structured to interpret an intake $O_2$ value, an exhaust $O_2$ value, and a biofuel $O_2$ correlation;
an $O_2$ fuel determination module structured to determine an $O_2$ biofuel value in response to the intake $O_2$ value the exhaust $O_2$ value, and the biofuel $O_2$ correlation:
a fuel composition module structured to determine a tank biofuel value of the fuel in the fuel tank in response to the $O_2$ biofuel value:
a biofuel reporting module structured to provide the tank biofuel value; and
an engine operations module structured to adjust a fueling parameter in response to the tank biofuel value, wherein the fueling parameter is utilized by the apparatus to control the fueling operation of the internal combustion engine, wherein the operation conditions module is further structured to interpret a brake specific fuel consumption (BSFC) input value and a biofuel BSFC correlation, the controller further comprising a BSFC fuel determination module structured to determine a BSFC biofuel value in response to the BSFC input value and the biofuel BSFC correlation, and wherein the fuel composition module is further structured to determine the tank biofuel value in response to the BSFC biofuel value.

12. The apparatus of claim 11, wherein:
the operation conditions module is further structured to interpret a current operating condition, an exhaust $NO_x$ value, and a biofuel $NO_x$ correlation;
the apparatus further comprising a $NO_x$ fuel determination module structured to determine a $NO_x$ biofuel value in response to the current operating condition, the exhaust $NO_x$ value, and the biofuel $NO_x$ correlation; and
wherein the fuel composition module is further structured to determine the tank biofuel value in response to any two of the $O_2$ biofuel value, the $NO_x$ biofuel value, and the BSFC biofitel value being within a threshold agreement value.

13. A method, comprising:
interpreting a current operating condition, an exhaust $NO_x$ value, and a biofuel $NO_x$ correlation;
determining a tank biofuel value of a fuel in a fuel tank in response to the current operating condition, the exhaust $NO_x$ value, and the biofuel $NO_x$ correlation; and
controlling a fueling operation from the fuel tank with the fuel in response to the determining of the tank biofuel value.

14. The method of claim 13, further comprising adjusting a fueling parameter in response to the tank biofuel value.

15. The method of claim 13, further comprising:
interpreting an intake $O_2$ value, an exhaust $O_2$ value, and a biofuel $O_2$ correlation; and
determining the tank biofuel value further in response to the intake $O_2$ value, the exhaust $O_2$ value, and the biofuel $O_2$ correlation.

16. The method of claim 13, further comprising:
interpreting a brake specific fuel consumption (BSFC) input value and a biofuel BSFC correlation; and
determining the tank biofuel value in response to the BSFC value and the biofuel BSFC correlation.

17. A system, comprising:
a direct injected internal combustion engine having an exhaust outlet and running excess oxygen;
a $NO_x$ sensor in flow communication with an exhaust stream within the exhaust outlet, the $NO_x$ sensor providing an exhaust $NO_x$ value; and
an electronic controller configured to determine a biofuel value of a fuel in response to the exhaust $NO_x$ value and for controlling a fueling operation of the direct injected internal combustion engine with the fuel in response to a determination of the biofuel value.

18. The system of claim 17, wherein the means for determining the biofuel value further comprises determining the biofuel value further in response to a brake specific fuel consumption (BSFC) of the internal combustion engine.

19. The system of claim 17, wherein the means for determining the biofuel value further comprises a means for determining an $O_2$ balance across the internal combustion engine.

* * * * *